United States Patent
Koorapaty et al.

(10) Patent No.: US 10,264,594 B2
(45) Date of Patent: Apr. 16, 2019

(54) RSSI MEASUREMENT DURING LBT

(71) Applicant: Telefonaktiebolaget LM Ericsson (publ), Stockholm (SE)

(72) Inventors: Havish Koorapaty, Saratoga, CA (US); Amitav Mukherjee, Fremont, CA (US); David Sugirtharaj, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 180 days.

(21) Appl. No.: 15/032,995

(22) PCT Filed: Mar. 16, 2016

(86) PCT No.: PCT/EP2016/055682
§ 371 (c)(1),
(2) Date: Apr. 28, 2016

(87) PCT Pub. No.: WO2016/146679
PCT Pub. Date: Sep. 22, 2016

(65) Prior Publication Data
US 2017/0142746 A1    May 18, 2017

Related U.S. Application Data

(60) Provisional application No. 62/134,372, filed on Mar. 17, 2015.

(51) Int. Cl.
*H04W 36/08* (2009.01)
*H04W 72/12* (2009.01)
(Continued)

(52) U.S. Cl.
CPC ...... *H04W 72/1242* (2013.01); *H04B 17/318* (2015.01); *H04L 43/106* (2013.01);
(Continued)

(58) Field of Classification Search
None
See application file for complete search history.

(56) References Cited

U.S. PATENT DOCUMENTS

2008/0233907 A1* 9/2008 Ibrahim .................. H03L 7/085
455/183.2
2008/0253331 A1* 10/2008 Gupta ................... H04W 36/30
370/331

(Continued)

FOREIGN PATENT DOCUMENTS

WO    2015081984 A1    6/2015

OTHER PUBLICATIONS

Unknown, Author, "Considerations on Measurements for LAA", ZTE, 3GPP TSG RAN WG1 Meeting #80, R1-150151, Athens, Greece, Feb. 9-13, 2015, 1-6.

(Continued)

*Primary Examiner* — Huy D Vu
*Assistant Examiner* — Bao G Nguyen
(74) *Attorney, Agent, or Firm* — Sage Patent Group

(57) ABSTRACT

The present disclosure relates to a method in a cellular radio communication network. The method comprises scheduling a radio device on a cell in an unlicensed frequency band. The method also comprises attempting to send a discovery signal for the cell in the unlicensed frequency band using a Listen-Before-Talk (LBT) procedure. The method also comprises receiving RSSI information about a Received Signal Strength Indicator (RSSI) measurement performed by the radio device, indicating that the radio device has failed to identify the cell, the RSSI information comprising a time stamp of the RSSI measurement. The method also comprises by means of the time stamp, associating the RSSI measurement with the attempt to send a discovery signal.

5 Claims, 5 Drawing Sheets

(51) Int. Cl.
*H04W 16/14* (2009.01)
*H04W 48/16* (2009.01)
*H04B 17/318* (2015.01)
*H04L 12/26* (2006.01)
*H04W 74/08* (2009.01)
*H04W 72/08* (2009.01)
*H04W 84/12* (2009.01)

(52) U.S. Cl.
CPC .......... *H04W 16/14* (2013.01); *H04W 36/08* (2013.01); *H04W 48/16* (2013.01); *H04W 74/0808* (2013.01); *H04W 72/082* (2013.01); *H04W 84/12* (2013.01)

(56) References Cited

U.S. PATENT DOCUMENTS

| | | | |
|---|---|---|---|
| 2011/0019582 A1* | 1/2011 | Okmyanskiy | H04L 41/0893 370/254 |
| 2012/0020240 A1* | 1/2012 | Miura | H04J 11/0023 370/252 |
| 2013/0208587 A1 | 8/2013 | Bala et al. | |
| 2014/0302865 A1 | 10/2014 | Bai et al. | |
| 2015/0063151 A1 | 3/2015 | Sadek et al. | |
| 2015/0163805 A1* | 6/2015 | Cattoni | H04W 72/0453 370/329 |

OTHER PUBLICATIONS

Unknown, Author, "On RRM Measurements and Reporting lor LAA", Ericsson, 3GPP TSG RAN WG1 Ad-hoc on LAA, R1-151136, Paris, France, Mar. 24-26, 2015, 1-6.

Unknown, Author, "Required functionality for support of LAA-L TE", Qualcomm Incorporated, 3GPP TSG-RAN WG2 Meeting #89, R2-150517, Athens, Greece, Feb. 9-13, 2015, 1-4.

Unknown, Author, "RRM/CSI measurement and feedback for unlicensed carrier", Huawei, HiSilicon, 3GPP TSG RAN WG 1 Meeting #80, R1-150047, Athens, Greece, Feb. 9-13, 2015, 1-5.

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 1-120.

3GPP, "3rd Generation Partnership Project; Technical Specification Group Radio Access Network; Evolved Universal Terrestrial Radio Access (E-UTRA); Physical layer.procedures (Release 11)", 3GPP TS 36.213 V11.4.0, Sep. 2013, 1-182.

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 1-347.

* cited by examiner

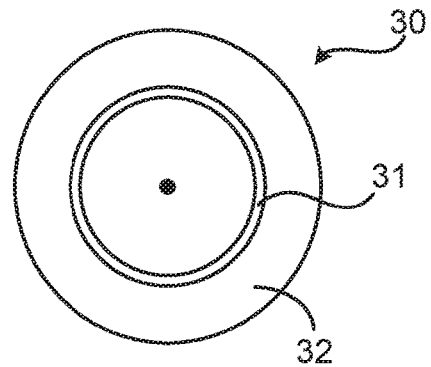
Fig. 9
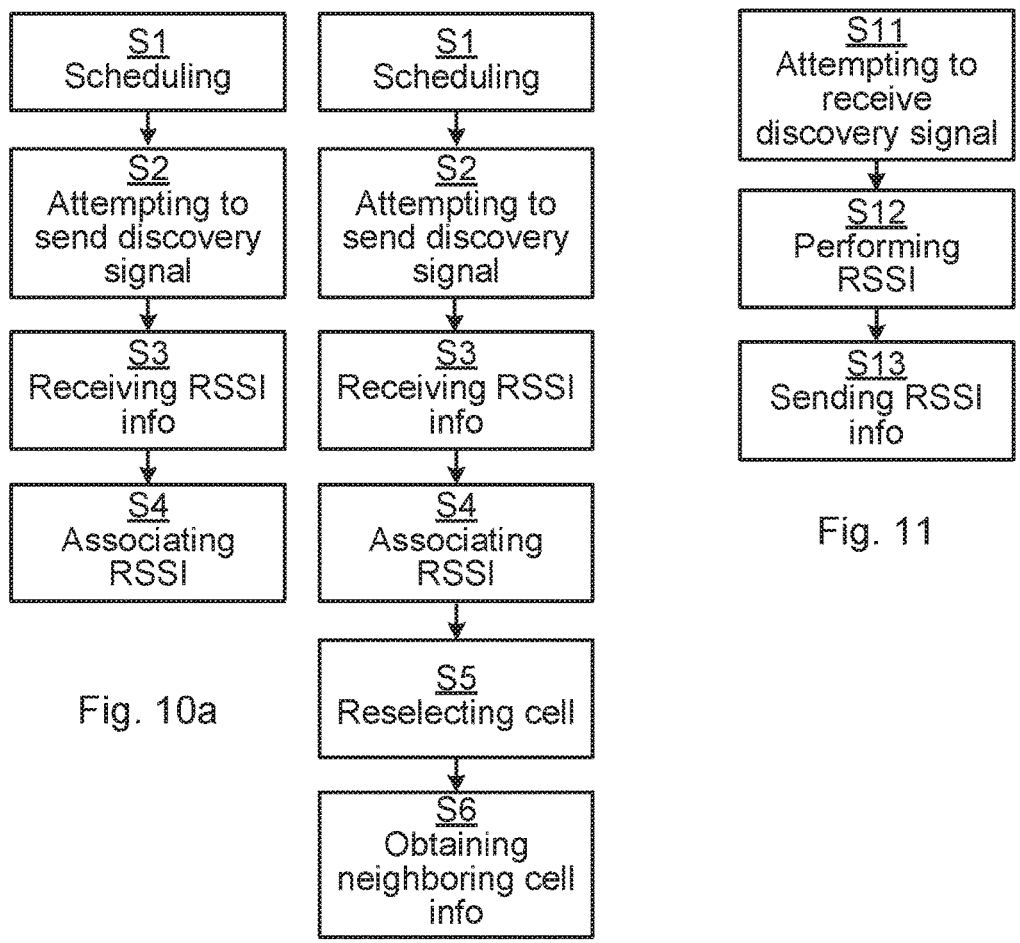
Fig. 10a
Fig. 10b
Fig. 11

RSSI MEASUREMENT DURING LBT

TECHNICAL FIELD

The present disclosure relates to methods and devices for using a cell of a cellular radio communication network in an unlicensed frequency band.

BACKGROUND

The Third Generation Partnership Project (3GPP) initiative "License Assisted Access" (LAA) intends to allow Long Term Evolution (LTE) equipment to also operate in the unlicensed 5 Giga Hertz (GHz) radio spectrum. The unlicensed 5 GHz spectrum is used as a complement to the licensed spectrum. Accordingly, devices connect in the licensed spectrum with a primary cell (PCell) and use carrier aggregation to benefit from additional transmission capacity in the unlicensed spectrum using secondary cell(s) (SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum may be shared with other radios of similar or dissimilar wireless technologies, a so called listen-before-talk (LBT) method is applied. Today, the unlicensed 5 GHz spectrum is mainly used by equipment implementing the Institute of Electrical and Electronics Engineers (IEEE) 802.11 Wireless Local Area Network (WLAN) standard, known under its marketing brand "Wi-Fi".

The LBT procedure leads to uncertainty at the evolved Node B (eNB) base station regarding whether it will be able to transmit downlink (DL) subframe(s) or not. This leads to a corresponding uncertainty at the User Equipment (UE) as to if it actually has a subframe to decode or not. An analogous uncertainty exists in the uplink (UL) direction where the eNB is uncertain if the UEs scheduled on the SCell actually transmitted or not.

Long Term Evolution (LTE)

LTE uses Orthogonal Frequency-Division Multiplexing (OFDM) in the downlink and Discrete Fourier Transform (DFT) spread OFDM, also referred to as single-carrier (SC) Frequency-Division Multiple Access (FDMA) in the uplink. The basic LTE downlink physical resource can thus be seen as a time-frequency grid with time on x-axis and frequency on the y-axis, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of to milliseconds (ms), each radio frame consisting of ten equally-sized subframes of length Tsubframe=1 ms. For normal cyclic prefix, one subframe consists of 14 OFDM symbols. The duration of each symbol is approximately 71.4 microseconds ($\mu$s).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A normal subframe of a downlink system with CFI=3 OFDM symbols as a control region is illustrated in FIG. 1.

From the LTE standard specification Release 11 (Rel-11) onwards, above described resource assignments can also be scheduled on the enhanced Physical Downlink Control Channel (EPDCCH). For Rel-8 to Rel-10 only Physical Downlink Control Channel (PDCCH) is available.

The reference symbols shown in the above FIG. 1 are the cell specific reference symbols (CRS) and are used to support multiple functions including fine time and frequency synchronization and channel estimation for certain transmission modes.

Physical Downlink Control Channel (PDCCH) and Enhanced PDCCH (EPDCCH)

The PDCCH/EPDCCH is used to carry downlink control information (DCI) such as scheduling decisions and power-control commands. More specifically, the DCI includes:

Downlink scheduling assignments, including Physical Downlink Shared Channel (PDSCH) resource indication, transport format, hybrid-Automatic Repeat Request (ARQ) information, and control information related to spatial multiplexing (if applicable). A downlink scheduling assignment also includes a command for power control of the Physical Uplink Control Channel (PUCCH) used for transmission of hybrid-ARQ acknowledgements in response to downlink scheduling assignments.

Uplink scheduling grants, including Physical Uplink Shared Channel (PUSCH) resource indication, transport format, and hybrid-ARQ-related information. An uplink scheduling grant also includes a command for power control of the PUSCH.

Power-control commands for a set of wireless devices, or terminals (e.g. UEs) as a complement to the commands included in the scheduling assignments/grants.

One PDCCH/EPDCCH carries one DCI message containing one of the groups of information listed above. As multiple wireless devices, or terminals (e.g. UEs) can be scheduled simultaneously, and each terminal can be scheduled on both downlink and uplink simultaneously, there may be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

Here follows a discussion on the start symbol for PDSCH and EPDCCH within the subframe. The OFDM symbols in the first slot are numbered from 0 to 6. For transmissions modes 1-9, the starting OFDM symbol in the first slot of the subframe for EPDCCH can be configured by higher layer signaling and the same is used for the corresponding scheduled PDSCH. Both sets have the same EPDCCH starting symbol for these transmission modes. If not configured by higher layers, the start symbol for both PDSCH and EPDCCH is given by the CFI value signaled in PCFICH.

Multiple OFDM starting symbol candidates can be achieved by configuring the UE in transmission mode to, by having multiple EPDCCH Physical Resource Block (PRB) configuration sets where for each set the starting OFDM symbol in the first slot in a subframe for EPDCCH can be configured by higher layers to be a value from {1,2,3,4}, independently for each EPDCCH set. If a set is not higher layer configured to have a fixed start symbol, then the EPDCCH start symbol for this set follows the CFI value received in the Physical Control Format Indicator Channel (PCFICH).

Carrier Aggregation

The 3GPP LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least have the possibility to have, the same structure as a Rel-8 carrier. A CA-capable wireless device (e.g. a UE) is assigned a PCell which is always activated, and one or more SCells which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling. This mapping from (E)PDCCH to PDSCH is also configured semi-statically.

LTE Measurements

A wireless device (e.g. a UE) performs periodic cell search and Reference Signal Received Power (RSRP) and Reference Signal Received Quality (RSRQ) measurements in Radio Resource Control (RRC) Connected mode. It is responsible for detecting new neighbor cells, and for tracking and monitoring already detected cells. The detected cells and the associated measurement values are reported to the network or a network node. Reports to the network can be configured to be periodic or aperiodic based a particular event.

Rel-12 LTE Discovery Signal (DRS)

To share the channel in the unlicensed spectrum, the LAA SCell cannot occupy the channel indefinitely. One of the mechanisms for interference avoidance and coordination among small cells is the SCell ON/OFF feature. In Rel-12 LTE, discovery signals were introduced to provide enhanced support for SCell ON/OFF operations. Specifically, these signals are introduced to handled potentially severe interference situation (particularly on the synchronization signals) resulted from dense deployment as well as to reduce UE inter-frequency measurement complexity.

The discovery signals in a DRS occasion are comprised of the Primary Synchronization Signal (PSS), Secondary Synchronization Signal (SSS), Cell-Specific Reference Signal (CRS) and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell identity (ID) detected from the PSS and SSS. The CSI-RS is another signal that can be used in dense deployments for cell or transmission point identification. FIG. 2 shows (as differently shaded/striped boxes, see the legend of the figure) the presence of these signals in a DRS occasion of length equal to two subframes in the time dimension (x-axis) (i.e. 2 ms) and also shows the transmission of the signals over two different cells or transmission points (TP1, TP2) for small cell on/off via SCell activation/deactivation.

The DRS occasion corresponding to transmissions from a particular cell may range in duration from one to five subframes for Frequency Division Duplex (FDD) and two to five subframes for Time Division Duplex (TDD). The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRS are transmitted in all downlink subframes and Downlink Pilot Time Slot (DwPTS) regions of special subframes.

The discovery signals should be useable by the UE for performing cell identification, reference signal received power (RSRP) and reference signal received quality (RSRQ) measurements. The RSRP measurement definition based on discovery signals is the same as in prior releases of LTE standard specifications. The Received Signal Strength Indicator (RSSI) measurement is defined as an average signal power over all OFDM symbols in the downlink parts of the measured subframes within a DRS occasion (e.g. 1 ms in accordance with Rel-12). The RSRQ is then defined as $$DRSRQ = N \times DRSRP/DRSSI,$$

where N is the number of PRBs used in performing the measurement, DRSRP is the RSRP measurement based on the discovery signals and DRSSI is the RSSI measured over the DRS occasion.

In Rel-12, RSRP measurements based on the CRS and CSI-RS in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

In Rel-13, the RSSI measurement has a duration of from one symbol up to 5 ms, as configured by the eNB.

When measurements are made on the CSI-RS in a DRS occasion, the UE restricts its measurements to a list of candidates sent to the UE by the network via RRC signaling. Each candidate in this list contains a Physical Cell ID (PCID), a Virtual Cell ID (VCID) and a subframe offset indicating the duration (in number of subframes) between the subframe where the UE receives the CSI-RS and the subframe carrying the SSS. This information allows the UE to limit its search. The UE correlates to the received signal candidates indicated by the RRC signal and reports back any CSI-RS RSRP values that have been found to meet some reporting criterion, e.g., exceeding a threshold value.

When a UE is being served on multiple carrier frequencies via a PCell and one or more SCells, the UE needs to perform Radio Resource Management (RRM) measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver for that frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a Discovery Measurement Timing Configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

Wireless Local Area Network (WLAN)

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. In a listen before talk (LBT) mechanism, used for unlicensed frequency bands as a means for fair access of the band, a device or node wishing to use the band, must first listen to see if it is occupied or not. Before a transmission burst on the LAA SCell, the equipment, device or node (UE or base station) performs a Clear Channel Assessment (CCA) check using "energy detect". The equipment or node observes the Operating Channel(s) for a defer period and a random number of observation slots. If the channel is found to be idle during these periods, the LBT is declared to have succeeded (LBT success or LBT succeed) and the node can transmit for time duration up to the transmission opportunity (TXOP) duration. The purpose of the defer period is to avoid colliding with Wi-Fi ACK frame transmissions (without LBT) following a Wi-Fi data frame burst. The random number of idle observation slots is designed to randomize the start of transmissions from different nodes that want to access the channel at the same time. Otherwise, if the channel is found to be busy, the LBT is declared to have failed (LBT failure or LBT fails), and no transmission can be made.

Licensed Assisted Access (LAA) to Unlicensed Spectrum Using LTE

Up to now, the spectrum used by LTE is dedicated to LTE. This has the advantage that the LTE system does not need to care about the coexistence issue and the spectrum efficiency can be maximized. However, the spectrum allocated to LTE is limited and cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

One way to utilize the unlicensed spectrum reliably is to transmit essential control signals and channels on a licensed carrier. That is, aggregation of LTE on licensed and unlicensed frequency bands, which is denoted Licensed assisted access (LAA). AUE is connected to a PCell in the licensed band and one or more SCells in the unlicensed band by using carrier aggregation. In this case we denote a secondary cell in unlicensed spectrum as license assisted secondary cell (LA SCell).

A problem of performing LTE measurements in LAA is that the CRS reference signals are sparsely scheduled and are further subject to LBT.

If a wireless device (e.g. a UE) has been scheduled on a particular subframe on the LAA SCell and tries to perform channel estimation, time-frequency tracking, or decoding when no subframe has actually been transmitted by the SCell, it may severely degrade the accuracy of the tracking loops, RRM measurements, and receiver buffer/soft buffer samples. There is currently no mechanism to prevent the scheduled UEs from attempting to measure a non-existent subframe.

The UE may identify the cell as a declaration of the validity of the measurement. A problem here is that it is difficult for the UE to know if the network did not succeed in the LBT or that it had succeeded but due to a bad channel was not able to identify the cell.

SUMMARY

It has already been proposed that the RSSI measurement quantity be included in the measurements reports to the network. The RSSI measurements reported should be layer 1 (L1) and layer 3 (L3) filtered and delivered in the relatively slow manner, else it would consume too much UL load. Periodically measured RSSI values are likely to have limited use in the eNB if it is not known under what circumstance they have been measured.

According to an aspect of the present disclosure, there is provided a method in a cellular radio communication network, e.g. performed by a network element, e.g. a base station such as an eNB. The network element schedules a radio device, e.g. a UE, on a cell in an unlicensed frequency band. The method comprises attempting to send a discovery signal for the cell in the unlicensed frequency band. When attempting to send the discovery signal, LBT is used. The discovery signal is sent if LBT succeeds but is not sent if LBT fails. The method also comprises receiving information about an RSSI measurement (RSSI information, e.g. a non-filtered RSSI value) performed by the UE and received by the network element. The reception of the RSSI information indicates that the UE has failed to identify the cell which is its serving SCell since the RSSI measurement is typically only reported by sending the RSSI information when the radio device has failed to receive the discovery signal and thus failed to identify the cell. It may be OK to fail detecting neighboring cells since those measurements would be discarded. The RSSI information comprises a time stamp of the RSSI measurement, facilitating associating the RSSI measurement with the corresponding attempt to send a discovery signal. Since the network knows whether the attempt to send the discovery signal, in view of LBT, was successful, and by means of the received RSSI information knows that the UE was unable to detect/identify the cell, the network may draw some conclusions about the interference in the cell both at the network element (e.g. eNB) and at the radio device (e.g. UE). For instance, if the attempt to send the discovery signal was successful, but the UE still was unable to identify the cell, the UE may be interfered by a hidden node (e.g. a Wi-Fi AP which is closer to the UE than to the eNB) if the RSSI is still high, or the UE may be too far away from the eNB, if the RSSI is low, and a reselection of SCell may be suitable. Also, LBT history of neighboring LAA cells may in some embodiments also be used by the network element. Transmissions from neighboring LAA cells also contribute to the RSSI and hence if it is known that these transmissions have failed, then the RSSI consists mainly of interference from other (hidden) nodes e.g. Wi-Fi access points.

According to another aspect of the present disclosure, there is provided a computer program comprising computer program code which is able to, when run on processor circuitry of a network element, cause the network element to perform an embodiment of the method above.

According to another aspect of the present disclosure, there is provided a method performed in a radio device, e.g. a UE. The radio device is connected via a cellular radio communication network comprising a network element (e.g. as per the aspect above). The radio device is scheduled on a cell in an unlicensed frequency band. The method comprises attempting to receive a discovery signal in the cell, from the communication network, and thereby identifying the cell. The method also comprises performing an RSSI measurement (e.g. a non-filtered RSSI value) and, in response to failing to receive the discovery signal of its serving SCell, sending information about the RSSI measurement to the network. The RSSI information may, in some embodiments, comprise a time stamp of the RSSI measurement.

According to another aspect of the present disclosure, there is provided a computer program comprising computer program code which is able to, when run on processor circuitry of a radio device, cause the radio device to perform an embodiment of the method above.

According to another aspect of the present disclosure, there is provided a computer program product comprising computer-executable components for causing a device, e.g. a network element or a radio device in accordance with the present disclosure, to perform an embodiment of a method of the present disclosure when the computer-executable components are run on processor circuitry comprised in the device.

According to another aspect of the present disclosure, there is provided a network element for a cellular radio communication network. The network element is configured for scheduling a radio device on a cell in an unlicensed frequency band. The network element comprises processor circuitry, and a storage unit storing instructions executable by said processor circuitry whereby said element is operative to attempt to send a discovery signal for the cell in the unlicensed frequency band using LBT. The network element is also operative to receive information about an RSSI measurement performed by the radio device, e.g. the UE. The reception of the RSSI information indicates to the network element that the UE has failed to identify the serving SCell (i.e. the UE has failed to receive the discovery signal).

According to another aspect of the present disclosure, there is provided a radio device able to connect via a cellular radio communication network. The radio device is configured for being scheduled by the network on a cell in an unlicensed frequency band. The radio device comprises processor circuitry, and a storage unit storing instructions executable by said processor circuitry whereby said radio device is operative to attempt to receive a discovery signal in the cell, from the communication network, and thereby identifying the cell. The radio device is also operative to, in response to failing to receive the discovery signal, perform an RSSI measurement (e.g. a non-filtered RSSI value) and send information about the RSSI measurement to the network.

According to another aspect of the present disclosure, there is provided a computer program product comprising an embodiment of a computer program of the present disclosure and a computer readable means on which the computer program is stored.

By means of embodiments of the present disclosure, the problem of scheduled UEs attempting to measure non-existent discovery signal on a DL LBT carrier is solved by including a non-filtered RSSI value with a time stamp (e.g. corresponding to the RSSI measurement times, such as at certain sub frame (SF) numbers or system frame number (SFN) in LTE) in the measurement reports from the UE. Based on the time stamp, the eNB can determine if the RSSI value was measured when it was not transmitting a discovery signal, and hence if the RSSI measurement is indicating the interference level experienced by the UE. For example, measurement reports are sent in the periodic case every 200 ms and if we assume the DMTC is 40 ms, this leads to an array of 5 RSSI-timestamp pairs.

Further, it is possible to define the RSSI-time stamp to be included in the report only in the cases when the cell identification fails and RSRP and RSRQ values are not valid. A new measurement event can be defined when the Cell identification fails and the RSSI-time stamp value is reported to the network. The network node (e.g. an eNB) can use the RSSI-time stamp value to correlate this with LBT status occurring at the same time to either assess the UE reception quality or neighbor cell interference.

In some embodiments, RSSI Interference Measurement during a silent period may be performed. A measurement occasion is configured to the UE to perform RSSI interference measurements. During this occasion, the eNBs belonging to a predefined area do not transmit and remain silent. Also, the eNBs may instruct its connected UEs in the same area to be silent at the same time. In this silent period, a UE may measure the RSSI interference from other LTE nodes and Wi-Fi. Alternatively, this can be done using a periodic triggered CSI reporting which tells the UE when to perform the RSSI measurement.

Embodiments of the present disclosure may give the following advantages:
- There is less system load on the UL control signaling when compared to continuously reporting the RSSI, since the RSSI measurement is only reported by the UE when Cell Identification fails.
- While the UE cannot distinguish between a LBT failure and poor reception quality, the eNB can. This leads to a more accurate measurement of the radio environment and hence leading to better co-existence in LAA.
- RSSI measurements during silent periods can further give a good indication of the interference in the channel.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

BRIEF DESCRIPTION OF THE DRAWINGS

Embodiments will be described, by way of example, with reference to the accompanying drawings, in which:

FIG. 9 schematically illustrates an embodiment of a computer program product, in accordance with the present disclosure.

FIG. 10a is a schematic flow chart of an embodiment of a method performed by a network element, in accordance with the present disclosure.

FIG. 10b is a schematic flow chart of other embodiments of the method performed by a network element, in accordance with the present disclosure.

FIG. 11 is a schematic flow chart of an embodiment of a method performed by a radio device, in accordance with the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The radio device discussed herein is often exemplified as a UE. However, any discussion relating to a UE is also relevant to any other type of radio device, if applicable. Similarly, the network element is often exemplified as a base station or eNB and any discussion relating thereto is also relevant to any other network element, if applicable, e.g. a network element in the radio access network (RAN) of the cellular communication network.

Figure 1:
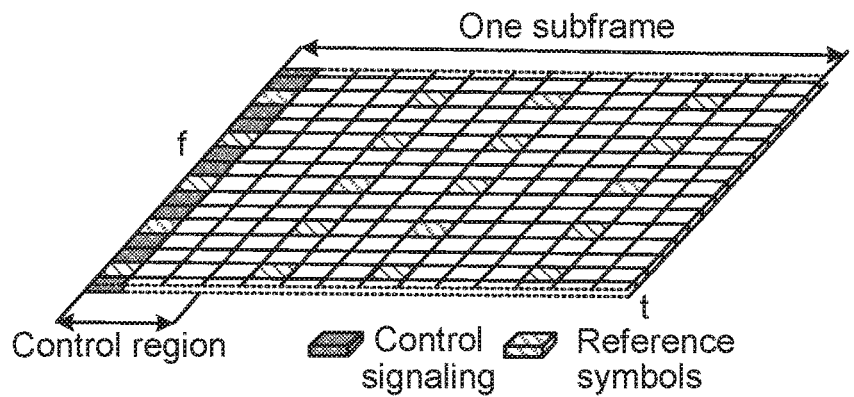
FIG. 1 illustrates a regular LTE downlink subframe.
Figure 2:
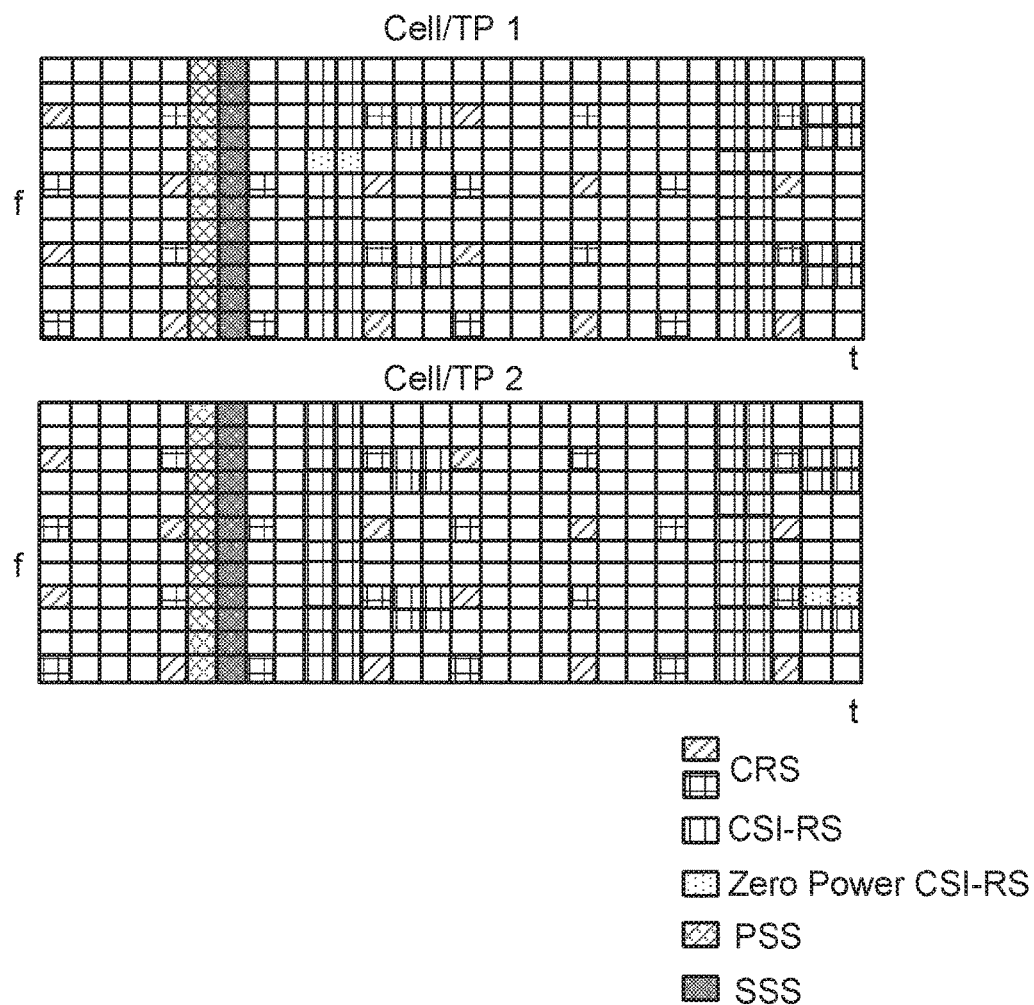
FIG. 2 illustrates discovery signalling at a DRS occasion in two different cells.
Figure 3:
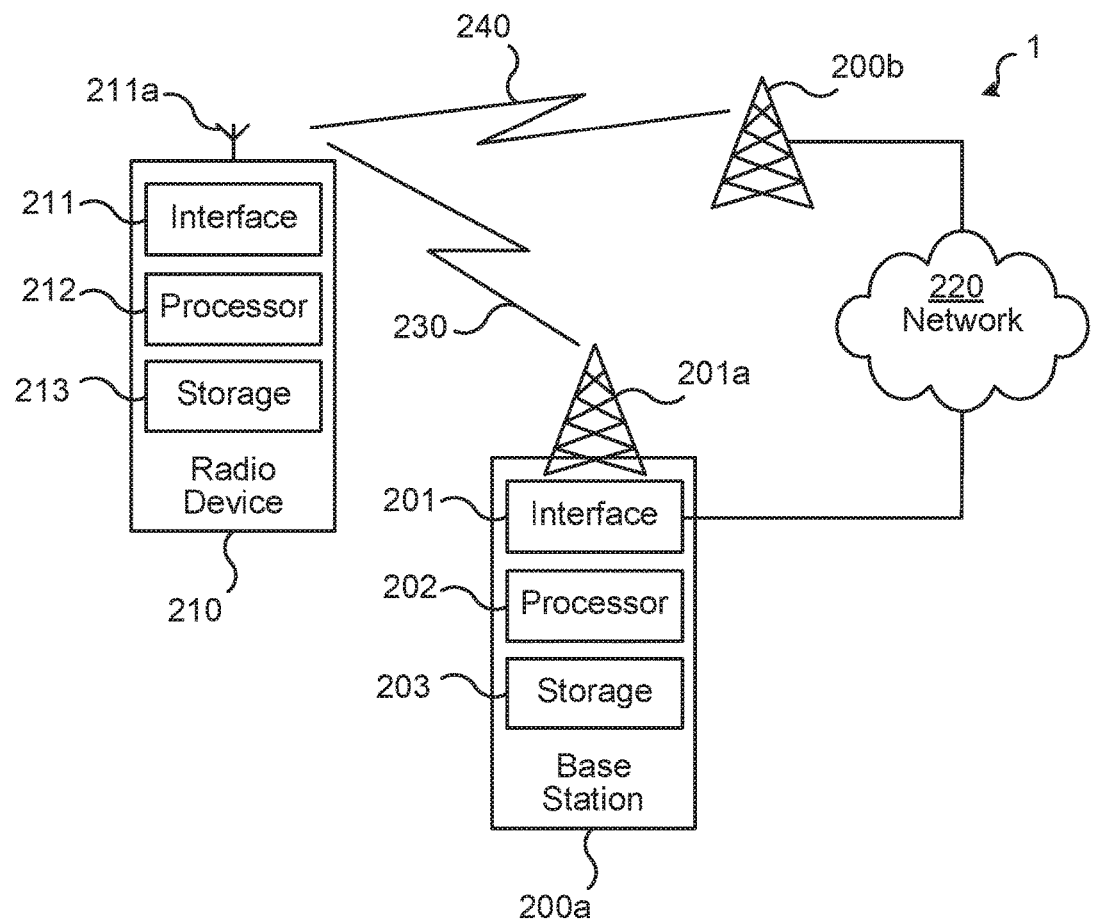
FIG. 3 is a schematic illustration of an embodiment of a cellular communication network and a radio device connected thereto, in accordance with the present disclosure.

FIG. 3 illustrates a wireless cellular communication network (NW) 1 comprising a more detailed view of NW element/network node, e.g. base station, 200 and wireless/radio device 210, in accordance with a particular embodiment. For simplicity, FIG. 3 only depicts network 220, network nodes 200b and 201a, and radio device 210. Network node 200 comprises processor 202, storage 203, interface 201 comprising antenna 201a. Similarly, radio device 210 comprises processor 212, storage 213, radio interface 211 comprising antenna 211a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections. In the figure, two eNBs 200a and 200b are depicted, each able to communicate, 230 and 240, respectively, with the radio device 210. eNB 200a operates on the PCell and eNB 200b on the SCell (i.e. the radio device is connected to both the PCell and the SCell). The eNB 200b (SCell) requests the eNB 200a (PCell) to configure the RSSI timestamp measurements from the radio device. The radio device 210 receives measurement configurations from the PCell.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 200 comprises processor 202, storage 203, interface 201, and antenna 201a. These components are depicted as single boxes located within a single larger box. In practice however, a network node may comprises multiple different physical components that make up a single illustrated component (e.g., interface 201 may comprise terminals for coupling wires for a wired connection and a radio transceiver for a wireless connection). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 200 may be configured to support multiple radio access technologies (RATs). In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to a wireless devices, such as WD 210, including any of the features or benefits disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. Storage 203 may be used to store any calculations made by processor 202 and/or any data received via interface 201.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200 and/or other WDs. WD 210 comprises processor 212, storage 213, interface 211, and antenna 211a. Like network node 200, the components of WD 210 are depicted as single boxes located within a single larger box, however in practice a wireless device may comprises multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the features or benefits disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. Storage 213 may be used to store any calculations made by processor 212 and/or any data received via interface 211.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

In some embodiments, the components described above may be used to implement one or more functional modules used in RSSI measurement during LBT failure. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 212 and/or 202, possibly in cooperation with storage 213 and/or 203. Processors 212 and/or 202 and storage 213 and/or 203 may thus be arranged to allow processors 212 and/or 202 to fetch instructions from storage 213 and/or 203 and execute the fetched instructions to allow the respective functional module to perform any features or functions disclosed herein. The modules may further be configured to perform other functions or steps not explicitly described herein but which would be within the knowledge of a person skilled in the art.

As recognized herein, RSRP and RSRQ measurements by the UE require positive identification and will fail when LBT fails. RSSI measurements on the other hand can always be measured by the UE. RSSI measurements during an LBT failure occasion can also be useful to the eNB. When tracked by the UE over a longer period of time, the eNB can get an idea of the other users on the carrier by using only the measurements during LBT failures. Such information can be used for the longer term channel selection. In order to distinguish between RSSI from LBT failure occasions and RSSI from LBT success occasions, two approaches are possible. The first approach would be that the UE detects LBT success/failure and tags the RSSI report with the corresponding detection result. In the second approach the UE simply reports RSSI together with a potential timestamp so that the eNB can keep track of and filter the reports based on its LBT history.

RSSI measurements are reported to the eNB regardless of whether LBT detection showed success or failure. According to some embodiments herein, the UE could either tag each report with the result from LBT detection or tag each report with a time stamp. With the latter option the eNB can keep track of the reports and filter them based on its LBT history.

According to embodiments of the present disclosure, a new measurement event is defined—herein called "Report RSSI Timestamp on Cell Identification Failure" (RTCIF). RSSI is measured by the UE during DMTC. The reason it is needed to be reported to the eNB only upon cell identification failure is that the RSRQ contains the RSSI when cell detection succeeds. This should be a reliable measured and filtered value from the UE. The RTCIF event may optionally be configured by the eNB. Since it is expected to consume UL load, possibly the eNB only activates the RTCIF if it senses that it cannot coexist in this channel and wants to evaluate the radio environment more exhaustively prior to abandoning the channel to scan the unlicensed band.

The RSSI-timestamp may be defined in the same way and reported via periodic measurement reporting. The RSSI-timestamp may be configured in this reporting mode when co-existence on the channel needs further analysis.

In the DMTC period, the eNB of the LAA SCell may be required to transmit its discovery signal and hence attempts the LBT procedure prior to the transmission time. Since the eNB may be monitoring the SCell's co-existence on the unlicensed carrier, it may request RSSI-timestamp measurements via the PCell which generates measurement configurations to all connected mode UEs in the LAA SCell.

RSSI-timestamp measurements may be supported for both periodic and aperiodic event based reporting.

While in RRC Connected mode and having an SCell (herein SCells generally implies LAA SCells) configured, the UE may perform measurements if the SCell is either (Media Access Control, MAC) activated or deactivated. Although performance requirements differ between active and inactive states, they are both based on the CRS and hence include the RSRP and RSRQ measurements of the discovery signal. To supplement this, the RSSI-timestamp measurements may also be configured for the UEs.

The UE performs measurements on the discovery signal every DMTC period. If the cell identification succeeds for the serving SCell and for each neighboring cell, the RSRP and RSRQ are measured and the filtered value is updated. Embodiments of the present disclosure relate to what happens when cell identification fails. Today, the RSRP and RSRQ would not be computed and the filtered value will not be updated. Instead, in accordance with the present disclosure, the RSSI value is computed and tagged with a subframe timestamp.

If periodic measurements are configured, the RSSI-timestamp measurements may be stored in the UE as an array. When it is time to report, new RSSI-timestamp measurements performed since the last report may be sent to the network.

If an event triggered aperiodic measurement report is configured, an RTCIF event may immediately be sent to the network, e.g. to the eNB.

Figure 4:
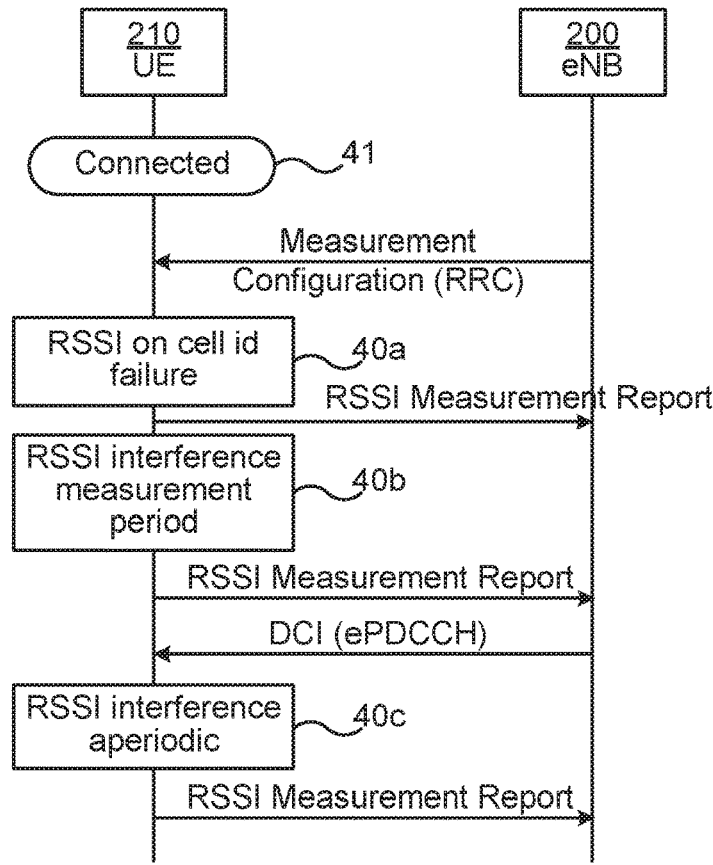
FIG. 4 is a schematic signalling diagram illustrating different embodiments of RSSI measurements, in accordance with the present disclosure.

FIG. 4 illustrates various measurement configuration alternatives for RSSI measurements 40 for a UE in connected state 41. If the UE 210 performs 40a RSSI measurement on cell identification failure, the UE may be configured to store and/or report RSSI information on cell identification failure. Since cell identification has failed, this measurement is likely to correspond to the case where the serving cell is silent, and hence is an indicator of background interference levels at the UE. If the UE performs RSSI measurements 40b on silent/measurement periods, the UE may be configured to store and/or report on silent periods. If the eNB triggers an aperiodic UE RSSI measurements 40c via an explicit command sent on the (E)PDCCH, the UE may perform the aperiodic RSSI measurement and send/report the RSSI information on uplink control channel. From the analytics point of view, instant RSSI measurements with timestamps that can be correlated to the LBT status may give the network a more accurate picture of the radio environment relative to an average filtered RSSI measurement from the UE.

The LBT status of the own LAA SCell as well as LBT history of neighboring LAA SCells can also be used to further identify interference outside of the network and factor in the channel selection or UE SCell selection. The LBT history may be shared among several eNBs serving a predefined area such as one floor in a building.

Figure 5:
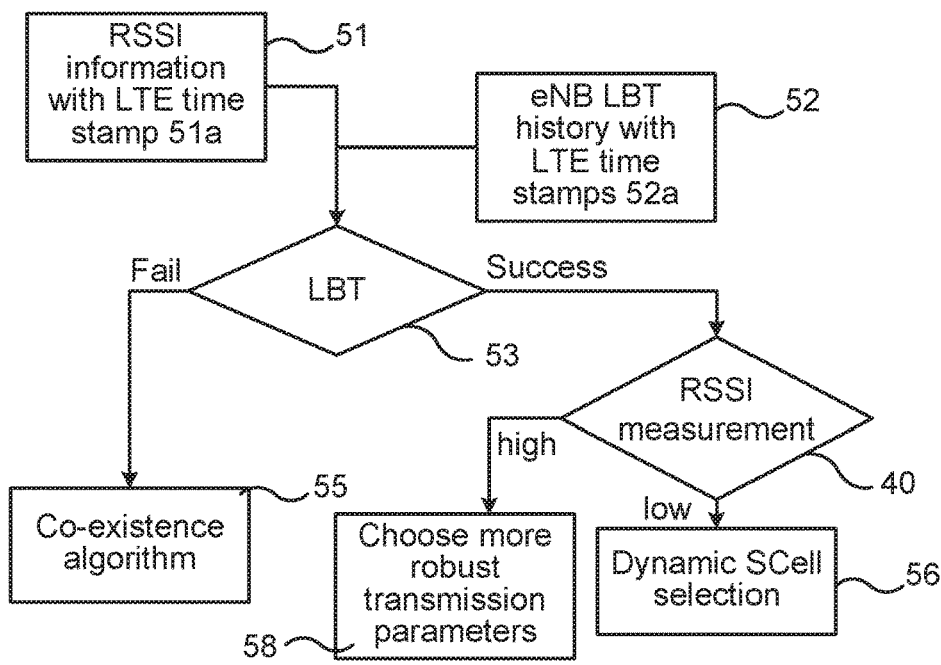
FIG. 5 is a schematic flow chart illustrating embodiments of an algorithm performed in the network element, in accordance with the present disclosure.

With reference to FIG. 5, when a radio device has not been able to detect the presence of an SCell, the RSSI is included in the report to the eNB. In this case, the network element 200, e.g. a eNB, obtains 51 RSSI information comprising a time stamp 51a from the radio device, as well as maintains 52 LBT history (LBT fail or success for LBT attempts corresponding to respective time stamps) comprising a corresponding time stamp 52a for a cell e.g. a SCell in unlicensed band. That the time stamp 52a of the LBT history corresponds to the time stamp 51a of the RSSI information implies that the RSSI information relates to the same point in time as the LBT history (LBT failure or success), e.g. the time stamps 51a and 52a comprise the same (possibly within a predetermined allowed range) time point. Thus, the RSSI measurement 40 may, by means of the time stamp 51a of the RSSI information, be associated with an attempt to send a discovery signal, the attempt being stored in the LBT history with its time stamp 52a. If the eNB LBT 53 fails and the RSSI-time stamp measurement 40 value (e.g. the numerical value of the RSSI measurement, e.g. in dBm) is high (above a threshold used for CCA (for sensing WiFi)), this may indicate that the channel is busy e.g. with Wi-Fi traffic. If the RSSI measurement is high at an LBT failure, it may indicate a presence of an interferer to both the radio device and the eNB, e.g. WiFi node interfering with both the UE and the eNB, i.e. not a hidden node. However, if the RSSI measurement is low at an LBT failure, it may indicate an interferer to the eNB, but which is hidden from the radio device. If the eNB 200 tracks these particular cases over a longer period of time and there is seen too often a (high) channel usage, the eNB may consider perform channel scanning 55 to find a better channel. Alternatively, the eNB can consider modifying 55 its co-existence algorithm, by e.g. adjusting its LBT parameters such as energy detection thresholds, contention window sizes and random back off durations, which determine the range of the random number that is used as the duration of LBT prior to a new DL transmission.

If the LBT 53 succeeds and the RSSI-timestamp 51a measurement 40 value is high (e.g. in relation to an RSSI threshold where cell identification under normal channel conditions is possible and it is expected to have a successful cell identification), this may point to a hidden node interfering with the radio device or UE, but its interference is not affecting the eNB. A possible reaction to this could be for the eNB to choose 58 more robust transmission parameters, such as transmit user data to the UE with higher power, select a more robust modulation and coding scheme (MCS) or activate a more advanced transmitter. The eNB may also adjust CCA energy detection thresholds employed by itself and/or by the UE.

If the LBT 53 succeeds and the corresponding RSSI-timestamp measurement 40 value is low (e.g. below an RSSI threshold, where cell identification becomes difficult under normal channel conditions), the eNB may perform 56 dynamic SCell re-selection, where the present SCell is changed to another SCell on another frequency.

Figure 6:
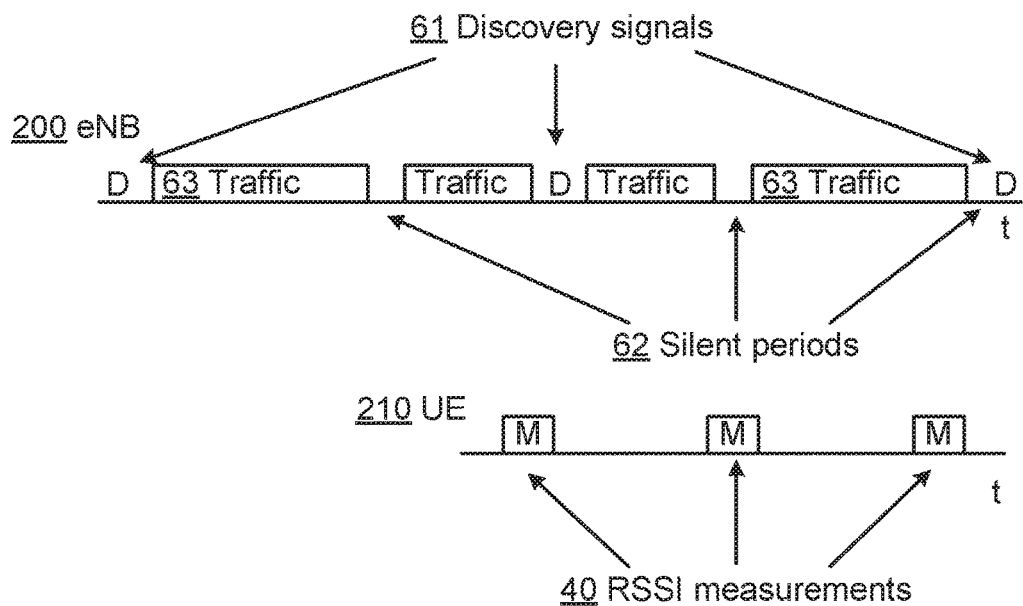
FIG. 6 schematically illustrates an embodiment of scheduling of a network element (here eNB) and a radio device (here UE) connected thereto, in accordance with the present disclosure.

FIG. 6 illustrates RSSI interference measurement 40 during a silent period 62. The eNB 200 may define a time period (covering one or multiple subframes) where e.g. 1 to 5 subframes can be held silent. During the silent period 62 no traffic 63 transmissions from or receptions to the eNB are made and the UE 210 can perform RSSI interference measurements 40 and listen for discovery signals 61 from the eNB. The silent period may be shared among several eNBs serving a predefined area such as one floor in a building. Alternatively, RSSI interference measurements may be triggered non-periodically by the eNB in a similar way to the CSI reporting mechanism using the DCI on the ePDCCH. Another alternative is that all UEs connected to the eNBs are also not allowed to transmit due to causing own network interference in the RSSI measurements.

In case of synthesis of interference environment with RSSI measurements from multiple UEs, RSSI reports from multiple UEs may be used to get more information regarding the interference environment. In one exemplary non-limiting embodiment, UEs that have similar reported values for RSRP and RSRQ are grouped together and the RSSI measurements from these UEs are then averaged together to generate a robust interference estimate from other operators or technologies occupying the channel for UEs with similar radio conditions to the serving cells.

In another embodiment, UEs belonging to the same group may also be tagged to be in a similar geographical location so that the RSSI values reported can be used to create a spatial map of the interference in the cell. RSSI reports from different groups of UEs with each group having different RSRP/RSRQ report profiles are used to determine the interference seen in the cell in different locations. The interference profile may then be used to determine whether any interference problems are isolated to some locations or are generally present everywhere in the cell so that channel re-selection by the eNB is desirable.

It is noted that an average filtered RSSI report from the UE says less to the eNB than a small array of unfiltered values tagged or associated with a time stamp in accordance with the present disclosure. In LAA, the time stamped RSSI measurement results may be compared with the LBT status whereby the network, e.g. the eNB, may draw more accurate conclusions about the radio environment of the UE. In some cases, these measurements could lead to channel scanning of the LAA Scell, while other cases may point to assigning a new SCell for the UE.

An RSSI measurement and reporting thereof during the DMTC in case of cell identification failure is performed in accordance with the present disclosure. Time stamping the RSSI report allows the eNB to determine if the UE is experiencing poor radio quality or if LBT had failed at the network side at this DMTC occasion, and to use the RSSI measurement as input into the channel selection algorithm.

Embodiments of the present disclosure define a measurement occasion to measure RSSI interference by creating a silent period for 1 or several eNBs in order for the UE to perform pure RSSI interference measurements.

Figure 7:
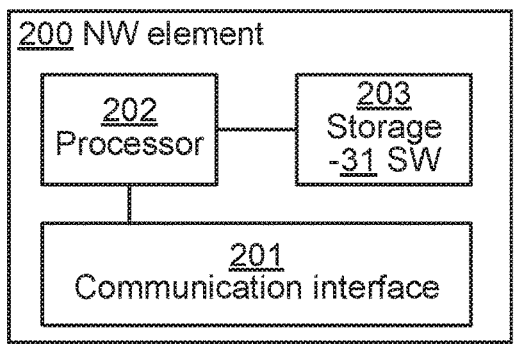
FIG. 7 is a schematic block diagram of an embodiment of a network element, in accordance with the present disclosure.

FIG. 7 is a schematic block diagram of an embodiment of a network (NW) element 200, e.g. a Radio Access Network (RAN) node such as an eNB, in a radio communication network 1 in which embodiments of the present disclosure may be performed.

The network element (or network node) 200 comprises processor circuitry 202 e.g. a central processing unit (CPU). The processor circuitry 202 may comprise one or a plurality of processing units in the form of microprocessor(s). However, other suitable devices with computing capabilities could be comprised in the processor circuitry 202, e.g. an application specific integrated circuit (ASIC), a field programmable gate array (FPGA) or a complex programmable logic device (CPLD). The processor circuitry 202 is configured to run one or several computer program(s) or software (SW) 31 (see also FIG. 9) stored in a storage 203 of one or several storage unit(s) e.g. a memory. The storage unit is regarded as a computer readable means 32 (see FIG. 9) as discussed herein and may e.g. be in the form of a Random Access Memory (RAM), a Flash memory or other solid state memory, or a hard disk, or be a combination thereof. The processor circuitry 11 may also be configured to store data in the storage 203, as needed. The network element 200 also comprises a communication interface 201 (e.g. a radio interface, especially if the NW element is comprised in base station such as an eNB), typically comprising a transceiver, for communicating with other elements within the communication network and with the radio device 210.

Thus, according to an aspect of the present disclosure, there is provided a network element 200 for a cellular radio communication network 1. The network element is configured for scheduling a radio device 210 on a cell in an unlicensed frequency band. The network element comprises processor circuitry 202, and a storage unit 203 storing instructions 31 executable by said processor circuitry whereby said network element 200 is operative to attempt to send a discovery signal 61 for the cell in the unlicensed frequency band using an LBT 53 procedure. The network element is also operative to receive RSSI information 51 about an RSSI measurement 40 performed by the radio device 210, indicating that the radio device has failed to identify the cell. The RSSI information comprises a time stamp 51a of the RSSI measurement. The network element is also operative to, by means of the time stamp 51a, associate the RSSI measurement with the attempt to send a discovery signal 61. In some embodiments, the network element is a base station 200, e.g. an evolved Node B (eNB), of the communication network 1.

Figure 8:
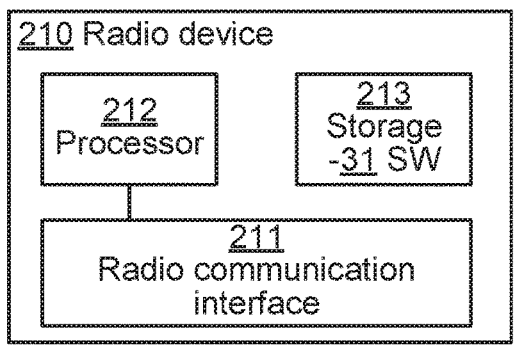
FIG. 8 is a schematic block diagram of an embodiment of a radio device, in accordance with the present disclosure.

FIG. 8 is a schematic block diagram of an embodiment of a radio device 210, e.g. a UE as discussed herein, in accordance with embodiments of the present disclosure.

The radio device 210 comprises processor circuitry 212 e.g. a central processing unit (CPU). The processor circuitry 212 may comprise one or a plurality of processing units in the form of microprocessor(s). However, other suitable devices with computing capabilities could be comprised in the processor circuitry 112, e.g. an application specific integrated circuit (ASIC), a field programmable gate array (FPGA) or a complex programmable logic device (CPLD). The processor circuitry 212 is configured to run one or several computer program(s) or software (SW) 31 (see also FIG. 9) stored in a storage 213 of one or several storage unit(s) e.g. a memory. The storage unit is regarded as a computer readable means 32 (see FIG. 9) as discussed herein and may e.g. be in the form of a Random Access Memory (RAM), a Flash memory or other solid state memory, or a hard disk, or be a combination thereof. The processor circuitry 212 may also be configured to store data in the storage 213, as needed. The radio device 210 also comprises a radio communication interface 211, typically comprising a transceiver, for communicating with elements within the communication network, e.g. with the network element 200 discussed in relation with FIG. 8, especially an eNB as discussed herein.

The radio device (also called wireless device or terminal) 210 may be any device or user equipment (UE), mobile or stationary, enabled to communicate over a radio channel in a communication network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Thus, according to an aspect of the present disclosure, there is provided a radio device 210 able to be connected via a cellular radio communication network 1 and configured for being scheduled by said network on a cell in an unlicensed frequency band. The radio device comprises processor circuitry 212, and a storage unit 213 storing instructions 31 executable by said processor circuitry whereby said radio device is operative to attempt to receive a discovery signal 61 in the cell, from the communication network 1. The radio device is also operative to perform an RSSI measurement 40. The radio device is also operative to, in response to failing to receive the discovery signal 61, send information 51 about the RSSI measurement 40 to network element 200, the RSSI information comprising a time stamp 51a of the RSSI measurement.

FIG. 9 illustrates an embodiment of a computer program product 30.

The computer program product 30 comprises a computer readable (e.g. non-volatile) medium 32 comprising a computer program 31 in the form of computer-executable components 31. The computer program/computer-executable components 31 may be configured to cause a processing device, e.g. the network element 200 or the radio device 210 as discussed herein, to perform an embodiment of a method of the present disclosure. The computer program/computer-executable components may be run on the processor circuitry 202/212 of the processing device for causing the device to perform the method. The computer program product 30 may e.g. be comprised in a storage unit or memory 203/213 comprised in the processing device and associated with the processor circuitry 202/212. Alternatively, the computer program product 30 may be, or be part of, a separate, e.g. mobile, storage means, such as a computer readable disc, e.g. CD or DVD or hard disc/drive, or a solid state storage medium, e.g. a RAM or Flash memory.

According to an aspect of the present disclosure, there is provided a computer program product 30 comprising computer-executable components 31 for causing a network element 200 to perform an embodiment of the method of performed by the cellular communication network as discussed herein when the computer-executable components are run on processor circuitry (202) comprised in the network element.

According to another aspect of the present disclosure, there is provided a computer program product 30 comprising computer-executable components 31 for causing a radio device 210 to perform an embodiment of the method performed by a radio device as discussed herein when the computer-executable components are run on processor circuitry 212 comprised in the radio device.

According to another aspect of the present disclosure, there is provided a computer program 31 comprising computer program code which is able to, when run on processor circuitry 202 of a network element 200 configured for scheduling S1 a radio device 210 on a cell in an unlicensed frequency band, cause the network element to attempt S2 to send a discovery signal 61 for the cell in the unlicensed frequency band using an LBT 53 procedure. The code is also able to cause the network element to receive S3 RSSI information 51 about an RSSI measurement 40 performed by the radio device 210, indicating that the radio device has failed to identify the cell, the RSSI information comprising a time stamp 51a of the RSSI measurement. The code is also able to cause the network element to, by means of the time stamp 51a, associate S4 the RSSI measurement with the attempt S2 to send a discovery signal 61.

According to another aspect of the present disclosure, there is provided a computer program 31 comprising computer program code which is able to, when run on processor circuitry 212 of a radio device 210 connected via a cellular radio communication network 1 comprising a network element 200, the radio device being scheduled on a cell in an unlicensed frequency band, cause the radio device to attempt S11 to receive a discovery signal 61 in the cell, from the communication network 1. The code is also able to cause the radio device to perform S12 an RSSI measurement 40. The code is also able to cause the radio device to, in response to failing to receive the discovery signal 61, send S13 information 51 about the RSSI measurement 40 to the network element 200, the RSSI information comprising a time stamp 51a of the RSSI measurement.

According to another aspect of the present disclosure, there is provided a computer program product 30 comprising the computer program of any of the above aspects and a computer readable means 32 on which the computer program is stored.

FIG. 10a illustrates an embodiment of the method performed in the radio communication network 1, e.g. by the network element 200. The method comprises scheduling S1 a radio device 210 on a cell in an unlicensed frequency band. The method also comprises, attempting S2 to send a discovery signal 61 for the cell in the unlicensed frequency band using a Listen-Before-Talk, LBT, 53 procedure. The method also comprises receiving S3 RSSI information 51 about an RSSI measurement 40 performed by the radio device 210, indicating that the radio device has failed to identify the cell. The RSSI information comprises a time stamp 51a of the RSSI measurement. The method also comprises, by means of the time stamp 51a, associating S4 the RSSI measurement with the attempt S2 to send a discovery signal 61.

Optionally, with reference to FIG. 10b, the method may in some embodiments also comprise reselecting S5 the cell in the unlicensed frequency band in view of the received S3 RSSI information 51 when the attempt S2 to send the discovery signal 61 which has been associated S4 with the RSSI information was successful (cf. the discussion above of dynamic SCell selection 56 in relation to FIG. 5).

Additionally or alternatively, the method may in some embodiments comprise obtaining S6 information about attempts to send discovery signals 61 in neighbouring cell(s) using LBT 53. Thus, the network element 200, or other part of the cellular network 1, may get additional information regarding the interference situation for the cell.

FIG. 11 illustrates an embodiment of the method performed in the radio device 210. The radio device is connected via a cellular radio communication network 1 comprising a network element 200. The radio device is scheduled on a cell in an unlicensed frequency band. The method comprises attempting S11 to receive a discovery signal 61 in the cell, from the communication network 1. The method also comprises performing S12 an RSSI measurement 40. The method also comprises, in response to failing to receive the discovery signal 61, sending S13 RSSI information 51 about the RSSI measurement 40 to the network element 200. The RSSI information comprises a time stamp 51a of the RSSI measurement.

In some embodiments of the present disclosure, the RSSI measurement 40 gives a non-filtered RSSI value, which may in some embodiments be included in the RSSI information 51.

In some embodiments of the present disclosure, the RSSI information, e.g. sent by the radio device 210 and obtained by the network element 200, comprises an array of a plurality of time stamps. This may be convenient if RSSI information 51 is not sent each time the radio device fails to receive the discovery signal 61, but rather periodically or after a predetermined number of failures.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method in a cellular radio communication network, the method comprising:
   scheduling a radio device on a cell in an unlicensed frequency band;
   attempting to send a discovery signal for the cell in the unlicensed frequency band using a Listen-Before-Talk (LBT) procedure;
   receiving Received Signal Strength Indicator (RSSI) information about an RSSI measurement performed by the radio device, indicating that the radio device has failed to receive the discovery signal, the RSSI information comprising a time stamp of the RSSI measurement;
   selecting a new frequency for the cell to operate in, in view of the received RSSI information when the attempt to send the discovery signal which has been associated with the RSSI information was successful;
   obtaining information about attempts to send discovery signals in one or more neighboring cells using the LBT procedure; and
   by means of the time stamp, associating the RSSI measurement with the attempt to send the discovery signal.

2. The method of claim 1, wherein the method is performed in a base station of the communication network.

3. The method of claim 1, wherein the RSSI information comprises a non-filtered RSSI value.

4. A non-transitory computer-readable medium comprising a computer program product stored thereupon, the computer program product comprising computer-executable components configured so as to cause a network element comprising processor circuitry executing the computer-executable components to:
   schedule a radio device on a cell in an unlicensed frequency band;

attempt to send a discovery signal for the cell in the unlicensed frequency band using a Listen-Before-Talk (LBT) procedure;

receive Received Signal Strength Indicator (RSSI) information about an RSSI measurement performed by the radio device, indicating that the radio device has failed to receive the discovery signal, the RSSI information comprising a time stamp of the RSSI measurement;

select a new frequency for the cell to operate in, in view of the received RSSI information when the attempt to send the discovery signal which has been associated with the RSSI information was successful;

obtain information about attempts to send discovery signals in one or more neighboring cells using the LBT procedure; and by means of the time stamp, associate the RSSI measurement with the attempt to send a discovery signal.

5. A network element for a cellular radio communication network, the network element being configured for scheduling a radio device on a cell in an unlicensed frequency band, wherein the network element comprises:

processor circuitry; and a storage unit storing instructions executable by said processor circuitry whereby said network element is operative to:

attempt to send a discovery signal for the cell in the unlicensed frequency band using a Listen-Before-Talk (LBT) procedure;

receive Received Signal Strength Indicator (RSSI) information about an RSSI measurement performed by the radio device, indicating that the radio device has failed to receive the discovery signal, the RSSI information comprising a time stamp of the RSSI measurement;

select a new frequency for the cell to operate in, in view of the received RSSI information when the attempt to send the discovery signal which has been associated with the RSSI information was successful;

obtain information about attempts to send discovery signals in one or more neighboring cells using the LBT procedure; and by means of the time stamp, associate the RSSI measurement with the attempt to send a discovery signal.

* * * * *